Figure 1:
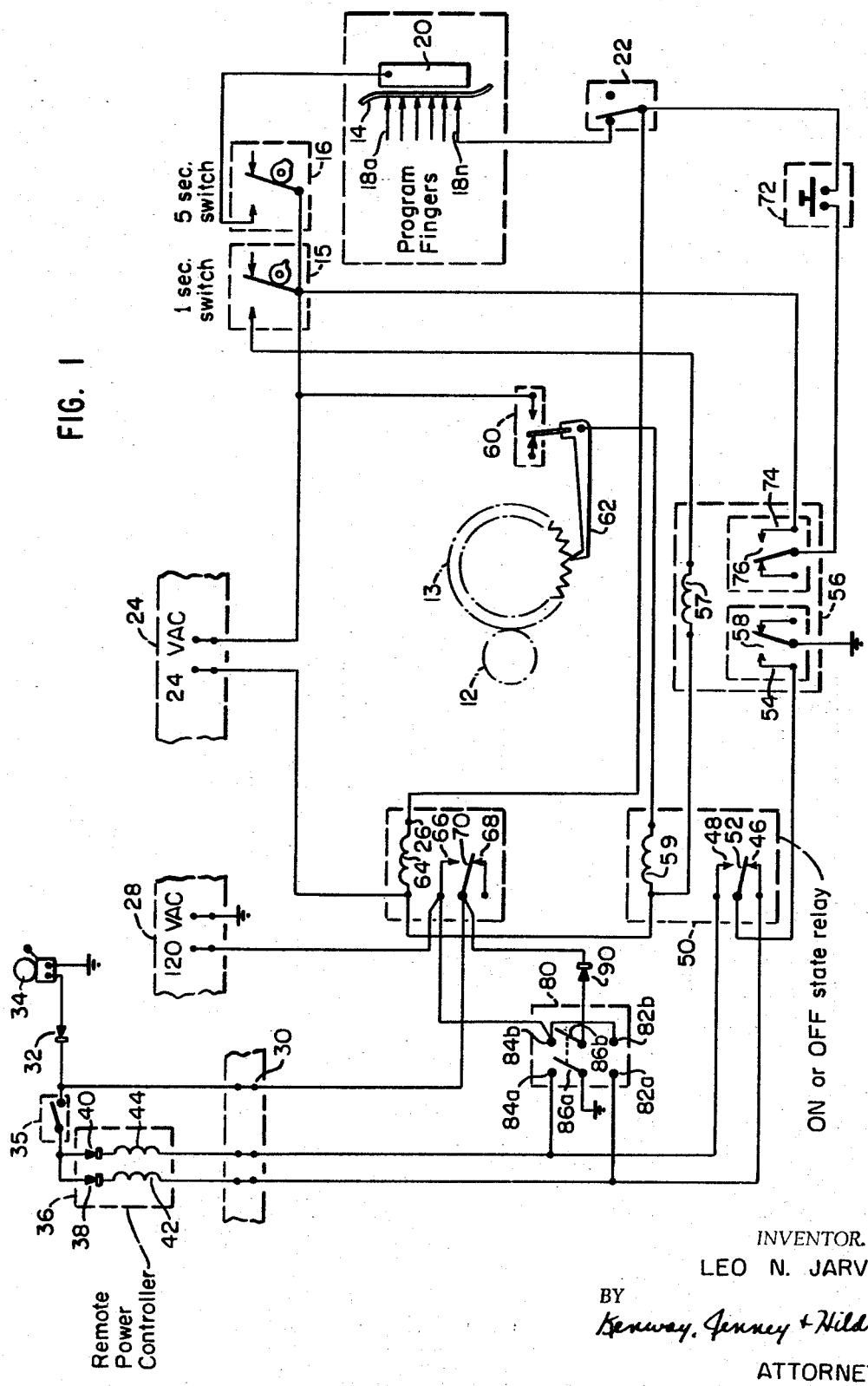

Sept. 26, 1967   L. N. JARVIS   3,344,288
ELECTRICAL CONTROL SYSTEM
Filed June 29, 1964   2 Sheets-Sheet 1

INVENTOR.
LEO N. JARVIS
BY
Kenway, Jenney + Hildreth
ATTORNEYS

INVENTOR.
LEO N. JARVIS

United States Patent Office 3,344,288
Patented Sept. 26, 1967

3,344,288
ELECTRICAL CONTROL SYSTEM
Leo N. Jarvis, Brookfield, Mass., assignor to The Standard Electric Time Company, Springfield, Mass., a corporation of Connecticut
Filed June 29, 1964, Ser. No. 378,632
6 Claims. (Cl. 307—141)

This invention relates in general to the control of electrical equipment, either manually or automatically. In particular, the invention relates to a system used in conjunction with a master program clock for turning equipment on or off, whether or not the master program clock is simultaneously controlling secondary clocks and furnishing program information for other purposes.

Systems in which a master clock is utilized to control a number of secondary clocks and to furnish program signal control are very common. One such system which has been in use for many years includes a tape-actuated system in which the tape is perforated to permit electrical contacts to be made through the tape to actuate desired signals. The perforations are calibrated in hours and minutes, and the tape is driven in synchronism with the master clock. Thus, any number of signal circuits whether local or remote may be closed at any time and for any length of time desired.

Among the functions generally classified as program signal control and handled by tape-actuated systems driven by master clocks are bells, whistles or lights in schools for class periods or in factories for shift changes. The present invention is described below in connection with such a clock system having program signal control because that is the presently preferred embodiment, although the invention may well be incorporated in other systems.

The invention finds application in the control of such equipment as heating, lighting, air-conditioning or stand-by power equipment which must be turned on or off at any hour of the day or night as dictated by circumstances such as temperature changes, changes of lighting level, or loss of primary power. Moreover, it is frequently desirable to turn electrical equipment on or off at times when personnel is not available.

It is a primary object of the present invention to extend the usefulness of program signal control systems.

It is a further object of the present invention to control remote utilities and to indicate their status of operation.

It is another object of the present invention to permit control of remote equipment automatically without loss of separate manual control.

In general, the present invention consists in a program signal control arrangement wherein distinction is made between the even and odd minutes registered by a master clock. Specifically, a cam is driven in synchronism with a master clock, and a cam follower makes available alternately circuits for providing impulses to "ON" and "OFF" control wires for remote equipment controllers. At the same time, the master clock furnishes synchronizing information to secondary clocks and program information to various locations for such purposes as audible signals.

Although other well known devices may be incorporated in the system to control remote equipment, the preferred embodiment of the invention utilizes the same tape which is used for program signal information to control the remote electrical equipment. Suitable perforations are provided in the tape and contact is made through the tape in a manner similar to that by which the program signal information is furnished. However, incorporated in the circuit is the alternate-minute switch mentioned above which remains closed during even minutes and open during odd minutes. Depending upon the position of the alternate-minute switch, a relay for turning equipment on or off is operated. A one-second duration switch in the circuit limits the availability of the ON and OFF control circuits to one second of each minute.

Figure 2:
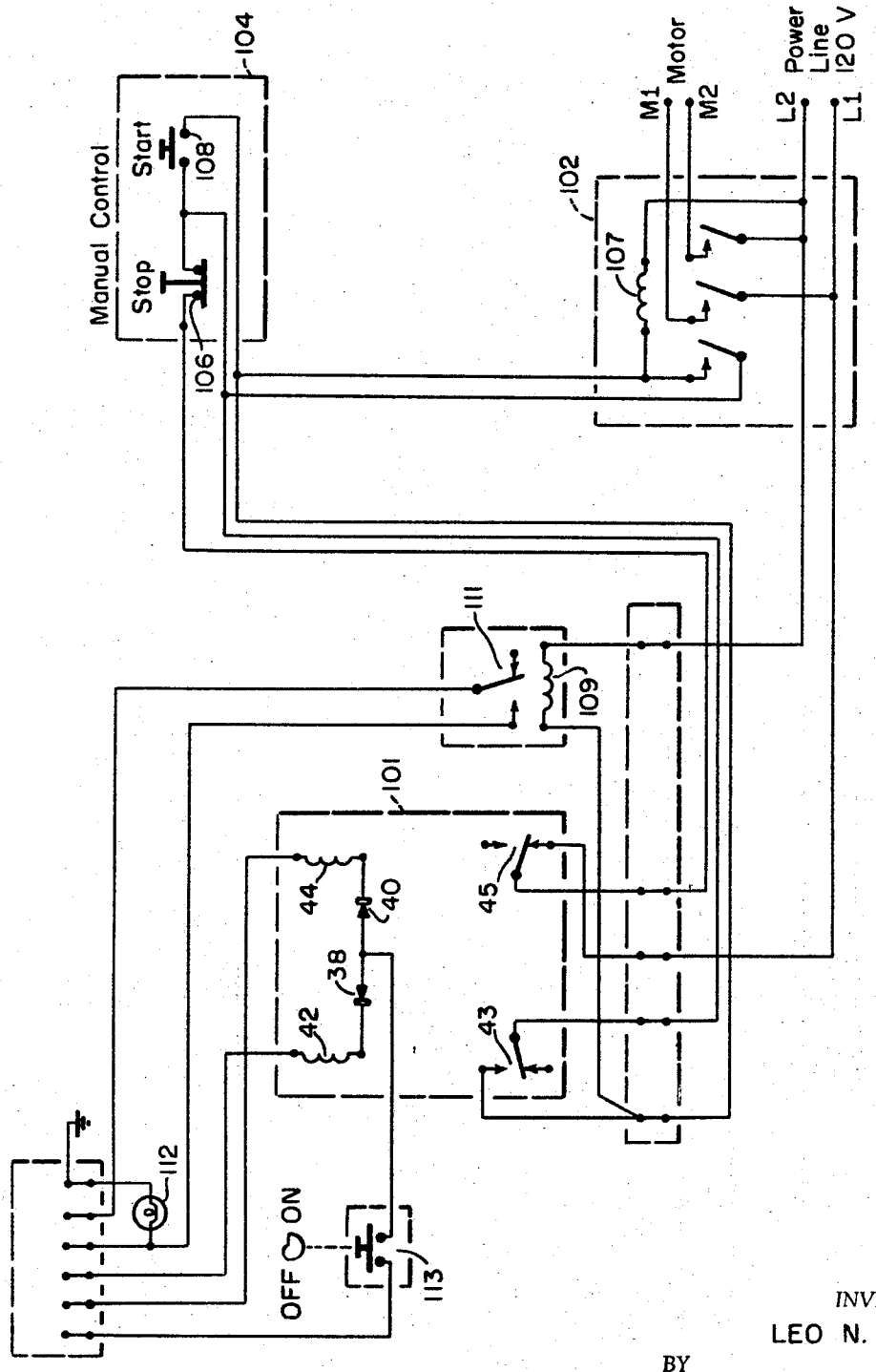

To avoid undesired operation of devices such as audible signals during the control phase of the operation, a duration contact switch is also utilized. For a better understanding of the present invention together with other and further objects, advantages and features, reference should be made to the following detailed description which should be read in conjunction with the appended drawing, in which:

FIG. 1 is a schematic diagram of a system built in accordance with the present invention; and FIG. 2 is a schematic diagram of an actual equipment control station.

In FIG. 1, there is shown schematically a preferred embodiment of the present invention. The heart of the illustrated system is the master clock which includes a synchronous drive motor 12. The motor drives the clock hands (not shown), the cam 13, the program tape 14, the cam of a one-second duration switch 15, and the cam of a five-second duration switch 16. The program tape may actually be more than one tape, depending upon the number of purposes it is designed to serve. However, whether single or multiple tapes are used, they function in the same conventional manner described below.

A series of program fingers 18a through 18n are arrayed at one side of the tape and are urged against the tape. Behind the tape is a program bar 20 and the tape is perforated to permit contact to be made between selected fingers and the program bar. The perforations may be calibrated in minutes and hours to permit circuits to be closed as desired. However, for remote equipment control as contemplated in the present invention, the perforations in the tape are preferably of one minute in width. Thus, circuits may be closed during a particular minute as governed by the duration switches 15 and 16, and as selected by the various fingers.

Connected, for example, to the finger 18n is a program switch 22 for setting up automatic control of remote equipment. Closing of the program switch 22 establishes a circuit which includes a voltage source 24, which may be a 24-volt source, a program relay 26, the switch 22, the finger 18n, the program bar 20, and the five-second duration switch 16.

With the flow of current through the coil of the program relay 26, the upper contact of that relay is closed, and voltage from a source 28, which may be a 120-volt source, now is present at an output terminal 30.

Connected to the terminal 30 is a diode 32 which is returned through a signal device such as the bell 34 to ground. Thus, for a period of five seconds, as determined by the five-second switch 16, the signal will sound.

Also connected to the output terminal 30 through a program switch 35 is the remote controller 36. It includes a pair of diodes 38 and 40 to which the output terminal 30 may be directly connected. Connected to the other sides of the diodes are the operating coils 42 and 44, respectively, of the controller. As is explained in greater detail below, these are the ON and OFF coils, respectively. The operation of the remote controller 36 is, of course, dependent upon the program switch 35, which, when opened, limits the system to manual operation as described below.

The return to ground for the operating coils is not direct as is that of the signal device 34. The coil 42 is connected to the lower contact 46, and the coil 44 to the upper contact 48 of a status relay 50. A swinging contact 52 of the same relay is then connected to a fixed contact 54 of a timing relay 56. The relay 56 has a coil 57 operative upon a swinging contact 58 through which a ground return may be established. Summarizing, to return either operating coil to ground, the relay 56 must be energized to close the contacts 54 and 58, and the position of the swinging contact 52 determines which operating coil is thus returned to ground.

Considering first which operating coil of the controller is energized, the position of the swinging contact 52 of the relay 50 is determined by the current flow or lack of current flow through the coil 59 of the relay 50. The coil 59 is in circuit with the voltage source 24 and a microswitch 60. The position of the microswitch 60 is determined by a cam-following lever 62, bearing upon the cam 13 driven by the motor 12. The cam 13 is provided with a surface which cooperates with the lever 62 to close the microswitch 60 during even minutes and to open it during odd minutes. Thus, a circuit including the first operating or ON coil 42 is made available during even minutes when the microswitch 60 is closed and the relay coil 59 is energized to close the contacts 48 and 52. However, the availability of the circuit including the operating or ON coil is limited to one second of the even minutes because the coil 57 of the relay 56 is energized through the one-second switch 15.

Conversely, when the microswitch 60 is opened during odd minutes by the action of the cam 13 and cam-following lever 62, a circuit including the second operating or OFF coil 44 is made available for one second during the odd minutes. Again, the ground return is provided by the relay 56 and the choice of operating coils is determined by the relay 50, the coil 59 of which is de-energized while the microswitch 60 is open.

The previously mentioned program relay 26 includes a coil 64, an upper contact 66, a lower contact 68 and a swinging contact 70. In the foregoing discussion, current flow through the coil 64 has been assumed as a result of contact being established between the finger 18n and the program bar 20 through the tape. Also, of course, the program switch 22 has been assumed to be closed as well as the five-second duration switch 16 to complete the circuit which includes the coil 64 and the voltage source 24.

Hence, automatic control of remote equipment is achieved by punching suitable perforations in the tape 14. Perforations in the even minute portions of the tape will cause equipment to be turned on; perforations in the odd minutes will cause equipment to be turned off.

Manual overrides are also incorporated in the system. If, for example, it is desired to sound a program signal manually at any time, a momentary push button 72 is available. A second set of contacts including a fixed contact 74 and a swinging contact 76 are incorporated in the relay 56. The coil 57 of the relay 56 is energized only during single seconds of each minute during which remote controller operation is possible. During the remaining fifty-nine seconds of each minute, the contacts 54 and 58 are open while the contacts 74 and 76 are closed. Thus, manual sounding of the signal through the push button 72 and the contacts 74 and 76 is achieved because a circuit including the voltage source 24 and the relay coil 64 is thus established. The contacts 66 and 70 of the relay 26 are thus closed and voltage from the source 28 appear on the output terminal 30 to sound the signal 34. Because, as noted, the contacts 54 and 58 are open at all times when the contacts 74 and 76 are closed, there is no effect upon the remote controller coils 40 and 42.

Another override of the system is organized about a switch 80 for permitting manual operation of the remote controller at any time. The switch 80 is a momentary contact, double-pole, double-throw switch. It includes fixed ON contacts 82a and 82b, fixed OFF contacts 84a and 84b, and a double blade 86a and 86b. The blade 86a is returned to ground; the blade 86b is connected through a diode 90 to the output terminal 30. When the switch is depressed in the ON position, voltage from the source 28 reaches the output terminal 30 through the contact 82b, the blade and the diode 90. It is thus applied to both operating coils 42 and 44 through the diodes 38 and 40. However, only the operating coil 42, the ON coil has a return to ground through the contact 82a and the other blade of the switch. The OFF coil 44 of the controller is similarly energized when the switch is depressed to bring the blades against the contacts 84a and 84b.

In these circumstances, when the remote controller is actuated by manual operation of the switch 80, no signal is sounded by the signal device 34 because of the diode 32 and the diode 90 which are placed in series, but with opposing polarities to prevent the flow of current from the voltage source 28 and through the signal device 34 to ground.

The diodes 38 and 40 in series with the operating coils of the controller are used to prevent feedback and to isolate remote controller coils in those situations where several are being used on different programs.

In FIG. 2, an arrangement of elements for remote device control is illustrated. Parts appearing in FIG. 1 have been given the same reference numerals in this figure to facilitate understanding.

The ON operating coil 42 is shown in a controller housing 101 along with its associated diode 38 as is the OFF operating coil 44 and its associated diode 40. Sets of contacts 43 operable in response to current flow in the coil 42 and sets of contacts 45 operable in response to current flow in the coil 44 are also disposed within the housing 101.

A line-starter 102 is under the control of the remote controller and also may be manually controlled by a stop-start push button switch 104. The operation of the stop-start switch 104 is straightforward. A set of "start" contacts 108 connect a power line $L_1$ through the contacts 45, the normally closed "stop" contacts 106 to the line-starter coil 107, the other side of the coil 107 being directly connected to the other power line $L_2$. Although control of a motor by the connection of power lines $L_1$ and $L_2$ through the line-starter contacts to the motor leads $M_1$ and $M_2$ is illustrated here, any item of electrical equipment can, of course, be similarly controlled.

If ON coil 42 is energized as described in connection with FIG. 1, either automatically by the tape 14 or manually by the switch 80, the contacts 43 are closed. This establishes a circuit from one side of the power line $L_1$, through the contacts 45, through the stop contacts 106 of the stop-start switch 104, the contacts 43 and the operating coil 107 of the line-starter. $L_1$ and $L_2$ are then directly connected to the motor lines $M_1$ and $M_2$ in the same fashion as described in connection with the manual control 104.

If OFF coil 44 is energized as described in connection with FIG. 1, the contacts 45 are opened, and current ceases to flow through the line-starter coil 107, opening the starter and disconnecting $L_1$ and $L_2$ from $M_1$ and $M_2$.

Connected in parallel with the line-starter coil 107 is a pilot light relay coil 109. Current flowing through the coil 109 at the same time current flows through the coil 107 causes the contacts 111 to close which permits a pilot lamp 112 to light and remain lit while the motor or other remote equipment is turned on. A similar pilot lamp may, if desired, be located at the master clock or central control point.

Moreover, a key control may also be included at any desired location. This control is a positive ON or OFF device, preferably operable by a removable key. It is composed of switch contacts 113 in the ground return of both the ON and OFF operating coils of the controller, and it may thus be used to place the controller on program operation or remove it from program operation.

The multiplicity of controls and their functions may be better understood by considering the precedence of manual control. First, the push button switch 104 will turn the motor or other equipment on or off at any time.

Second, automatic or program operation as well as manual operation by the switch 80 is subject to the key control switch 113. Further, opening of the switch 35 (FIG. 1) confines all operation to manual control.

While what has been described constitutes a preferred embodiment of the invention, other modifications will suggest themselves to those skilled in the art once they have the benefit of the foregoing disclosure. As an illustrative but not a limiting example, a program clock utilizing a pin and drum, or other mechanism rather than tape-actuated, could be substituted in the embodiment described. The invention should, therefore, not be limited to the details of the foregoing disclosure, but only by the spirit and scope of the appended claims.

What is claimed is:

1. In a master program clock system, apparatus for controlling electrical equipment comprising a first relay for turning said equipment on, a second relay for turning said equipment off, a voltage source, a third relay having first and second contacts and a switch connected in series, said switch including contacts and means for closing said contacts during predetermined fractions of predetermined periods to energize said third relay from said voltage source, means for making available a first circuit including first contacts of said third relay and said first relay during certain of said predetermined periods and for making available a second circuit including second contacts of said third relay and said second relay during others of said predetermined periods, means for closing said first circuit to turn said equipment on and means for closing said second circuit to turn said equipment off.

2. Apparatus for controlling remote equipment comprising a clock, a program device driven by said clock, a source of voltage, means for electrically connecting said source of voltage to said remote equipment, means for electrically disconnecting said source of voltage from said remote equipment, and means also driven by said clock connected in series with said program device and interposed between said source of voltage and said remote equipment for limiting the operability of said connecting means and said disconnecting means to predetermine discrete periods of time.

3. Apparatus as defined in claim 2 wherein said means connected in series with said program device comprises a first switch driven by said clock to close for only predetermined fractions of each minute to limit connection and disconnection of said voltage source to said remote equipment to only said predetermined fractions of each minute and a second switch driven by said clock to limit connection of said voltage source to said remote equipment to predetermined alternate minutes and disconnection of said voltage source from said remote equipment to remaining alternate minutes.

4. In a master clock system having a master clock and a tape-controlled program for providing signals of a first predetermined duration and at predetermined times, a circuit for controlling remote equipment comprising a source of voltage, means for connecting said source of voltage to said remote equipment, means for disconnecting said remote equipment from said source of voltage, a switch interposed between said source of voltage and said connecting and disconnecting means, means driven by said clock for closing said switch only during repetitive periods of a second predetermined duration, and means controlled by said tape for actuating said connecting and said disconnecting means at predetermined times.

5. Apparatus as in claim 4 wherein said means driven by said clock comprises a cam driven by said clock in synchronized relationship with said tape and a cam follower operable upon said switch to periodically reverse the position of said switch whereby said connecting means may be actuated only during even minutes registered by said clock and said disconnecting means may be actuated only during odd minutes registered by said clock.

6. In a master clock system having a tape-controlled program and a master clock, apparatus for controlling remote equipment comprising a source of voltage, means for connecting said source of voltage to said remote equipment during even minutes registered by said clock, means for disconnecting said source of voltage from said remote equipment during odd minutes registered by said clock, means for actuating said connecting means and said disconnecting means in accordance with said tape-controlled program and manually operable switching means connected between said source of voltage and said remote equipment for overriding said tape-controlled program.

References Cited

UNITED STATES PATENTS

| | | | |
|---|---|---|---|
| 2,577,155 | 12/1951 | Rex | 307—141.8 X |
| 2,585,079 | 2/1952 | Beaufoy | 307—132 X |
| 2,664,948 | 1/1954 | Geoffrion | 307—141.8 |
| 2,962,610 | 11/1960 | Husband | 307—141.4 |
| 3,067,405 | 12/1962 | Hurlimann et al. | 307—141 X |
| 3,164,731 | 1/1965 | Long | 307—115 |
| 3,245,070 | 4/1966 | Beilfuss | 340—309.4 |

ORIS L. RADER, *Primary Examiner.*

T. B. JOIKE, *Assistant Examiner.*